(12) United States Patent
Sloan (10) Patent No.: US 11,117,058 B2
(45) Date of Patent: *Sep. 14, 2021

(54) SYSTEM AND METHOD FOR DYNAMICALLY VALUATING PLAYERS DURING A FANTASY DRAFT

(71) Applicant: Disney Enterprises, Inc., Burbank, CA (US)

(72) Inventor: J. Nathaniel Sloan, Bellevue, WA (US)

(73) Assignee: Disney Enterprises, Inc., Burbank, CA (US)

( * ) Notice: Subject to any disclaimer, the term of this patent is extended or adjusted under 35 U.S.C. 154(b) by 100 days.

This patent is subject to a terminal disclaimer.

(21) Appl. No.: 16/552,412

(22) Filed: Aug. 27, 2019

(65) Prior Publication Data

US 2019/0381411 A1  Dec. 19, 2019

Related U.S. Application Data

(63) Continuation of application No. 15/410,390, filed on Jan. 19, 2017, now Pat. No. 10,398,988, which is a continuation of application No. 14/983,527, filed on Dec. 29, 2015, now abandoned, which is a continuation of application No. 12/760,269, filed on Apr. 14, 2010, now abandoned.

(51) Int. Cl.
| | |
|---|---|
| *A63F 13/00* | (2014.01) |
| *A63F 13/828* | (2014.01) |
| *A63F 13/63* | (2014.01) |
| *G07F 17/32* | (2006.01) |
| *A63F 13/35* | (2014.01) |
| *A63F 13/537* | (2014.01) |
| *A63F 13/792* | (2014.01) |
| *A63F 13/87* | (2014.01) |
| *A63F 13/65* | (2014.01) |

(52) U.S. Cl.
CPC ............ *A63F 13/828* (2014.09); *A63F 13/35* (2014.09); *A63F 13/537* (2014.09); *A63F 13/63* (2014.09); *A63F 13/792* (2014.09); *A63F 13/87* (2014.09); *G07F 17/3223* (2013.01); *G07F 17/3276* (2013.01); *G07F 17/3286* (2013.01); *A63F 13/65* (2014.09); *A63F 2300/575* (2013.01); *A63F 2300/69* (2013.01); *A63F 2300/8052* (2013.01)

(58) Field of Classification Search
CPC ....... A63F 13/795; A63F 13/828; A63F 13/85
See application file for complete search history.

(56) References Cited

U.S. PATENT DOCUMENTS

2010/0075729 A1* 3/2010 Allen ..................... A63F 13/12
463/7

* cited by examiner

*Primary Examiner* — Lawrence S Galka
(74) *Attorney, Agent, or Firm* — Fay Kaplun & Marcin, LLP (57) ABSTRACT

A system and method for dynamically valuating players during a fantasy draft are disclosed. In one embodiment, a method comprises storing, in an electronic device, a list of players, each player associated with a base value, receiving one or more player sections, and determining one or more adjusted values for a respective one or more particular players based at least in part on the base values of the particular players and the player selections.

20 Claims, 8 Drawing Sheets

SYSTEM AND METHOD FOR DYNAMICALLY VALUATING PLAYERS DURING A FANTASY DRAFT

CROSS REFERENCE TO RELATED APPLICATIONS

This application is a continuation of U.S. patent application Ser. No. 14/983,527, filed on Dec. 29, 2015 and titled "System And Method For Dynamically Valuating Players During A Fantasy Draft," which is a continuation of U.S. patent application Ser. No. 12/760,269, filed on Apr. 14, 2010 and entitled "System And Method For Dynamically Valuating Players During A Fantasy Draft," the contents of each prior application are incorporated by reference herein.

FIELD

This application relates to fantasy drafts.

BACKGROUND

A fantasy sport game is a simulation game where users act as managers or owners of simulated sports teams called "fantasy teams," where each team comprises a number of "players." Thus, the term "owner" is used to refer to a participant in the fantasy sport game. An owner can be a natural person or a computer-controlled opponent. A "user" is a fantasy owner who is also a natural person. In contrast, the term "player" refers to one of the selectable fantasy characters. In certain fantasy sports games, each player corresponds to an athlete in a professional sports league.

BRIEF SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description," one will understand how the features of this invention provide advantages over other methods of automated fantasy drafting.

In one aspect, a method of selecting a player in a fantasy draft comprises receiving one or more user-defined rules with respect to a list of players, wherein each player on the list is associated with one or more characteristics from a set of predefined characteristics and wherein at least one of the user-defined rules specifies a particular characteristic and selecting, in an electronic device, a player from the list of players satisfying the one or more user-defined rules.

In one aspect, a method of selecting a player in a fantasy draft comprises receiving one or more user-defined rules with respect to a list of players, wherein each player on the list is associated with one or more statistic values for a respective one or more statistics and wherein at least one of the user-defined rules specifies a particular statistic and selecting, in an electronic device, a player from the list of players satisfying the one or more user-defined rules.

In one aspect, a system for selecting a player on a fantasy draft comprises a network interface configured to receive one or more user-defined rules with respect to a list of players, wherein each player on the list is associated with one or more characteristics from a set of predefined characteristics and wherein at least one of the user-defined rules specifies a particular characteristic, and a processor configured to select a player from the list of players satisfying the one or more user-defined rules.

In one aspect, a system for selecting a player in a fantasy draft comprises means for receiving one or more user-defined rules with respect to a list of players, wherein each player on the list is associated with one or more characteristics from a set of predefined characteristics and wherein at least one of the user-defined rules specifies a particular characteristic and means for selecting a player from the list of players satisfying the one or more user-defined rules.

In one aspect, a computer-readable medium has instructions encoded thereon which, when executed by a processor, cause an apparatus to perform a method of selecting a player in a fantasy draft comprising receiving one or more user-defined rules with respect to a list of players, wherein each player on the list is associated with one or more characteristics from a set of predefined characteristics and wherein at least one of the user-defined rules specifies a particular characteristic and selecting a player from the list of players satisfying the one or more user-defined rules.

In another aspect, a method of selecting a player in a fantasy draft comprises storing a ranked list of players, each player associated with one or more characteristics from a predefined set of characteristics, defining one or more rules which specify the maximum number of active players having each of the characteristics and a maximum number of players having of each of the characteristics, storing a roster of previously selected players having the maximum number of active players for a particular characteristic and less than the maximum number of players for the particular characteristic, and automatically selecting, in an electronic device, based on the stored roster, a player for the roster from the ranked list of players satisfying the one or more rules such that a player is selected with a lower rank than a player with the particular characteristic.

In another aspect, a system for selecting a player in a fantasy draft comprises a memory configured to store a ranked list of players, each player associated with one or more characteristics from a predefined set of characteristics, wherein the memory is further configured to store one or more rules which specify the maximum number of active players having each of the characteristics and a maximum number of players having of each of the characteristics, wherein the memory is further configured to store a roster of previously selected players having the maximum number of active players for a particular characteristic and less than the maximum number of players for the particular characteristic, and a processor configured to automatically select, based on the stored roster, a player for the roster from the ranked list of players satisfying the one or more rules such that a player is selected with a lower rank than a player with the particular characteristic.

In another aspect, a system for selecting a player in a fantasy draft comprises means for storing a ranked list of players, each player associated with one or more characteristics from a predefined set of characteristics, means for defining one or more rules which specify the maximum number of active players having each of the characteristics and a maximum number of players having of each of the characteristics, means for storing a roster of previously selected players having the maximum number of active players for a particular characteristic and less than the maximum number of players for the particular characteristic, and means for selecting, based on the stored roster, a player for the roster from the ranked list of players satisfying the one or more rules such that a player is selected with a lower rank than a player with the particular characteristic.

In another aspect, a computer-readable medium has instructions encoded thereon which, when executed by a processor, cause an apparatus to perform a method of selecting a player in a fantasy draft comprising storing a ranked list of players, each player associated with one or more characteristics from a predefined set of characteristics, defining one or more rules which specify the maximum number of active players having each of the characteristics and a maximum number of players having of each of the characteristics, storing a roster of previously selected players having the maximum number of active players for a particular characteristic and less than the maximum number of players for the particular characteristic, and selecting, based on the stored roster, a player for the roster from the ranked list of players satisfying the one or more rules such that a player is selected with a lower rank than a player with the particular characteristic.

In one aspect, a method of valuating a player in a fantasy draft comprises storing, in an electronic device, a list of players, each player associated with a base value, receiving one or more player selections, and determining one or more adjusted values for a respective one or more particular players, based at least in part on the base values of the particular players and the player selections.

In one aspect, a system for valuating a player in a fantasy draft comprises a memory configured to store a list of players, each player associated with a base value, a network interface configured to receive one or more player selections, and a processor configured to determine one or more adjusted values for a respective one or more particular players, based at least in part on the base values of the particular players and the player selections.

In one aspect, a system of valuating a player in a fantasy draft, the system comprises means for storing a list of players, each player associated with a base value, means for receiving one or more player selections, and means for determining one or more adjusted values for a respective one or more particular players, based at least in part on the base values of the particular players and the player selections.

In one aspect, a computer-readable medium has instructions encoded thereon which, when executed by a processor, cause an apparatus to perform a method of valuating a player in a fantasy draft comprising storing a list of players, each player associated with a base value, receiving one or more player selections, and determining one or more adjusted values for a respective one or more particular players, based at least in part on the base values of the particular players and the player selections.

In another aspect, a method of valuating a player in a fantasy draft comprises storing a list of players, each player associated with a base value, receiving one or more user-defined rules for the draft, and determining adjusted values for each of the list of players, based at least in part on base values of the players and the user-defined rules.

In another aspect, a system for valuating a player in a fantasy draft comprises a memory configured to store a list of players, each player associated with a base value, a network interface configured to receive one or more user-defined rules for the draft, and a processor configured to determine adjusted values for each of the list of players, based at least in part on base values of the players and the user-defined rules.

In another aspect, a system for valuating a player in a fantasy draft comprises means for storing a list of players, each player associated with a base value, means for receiving one or more user-defined rules for the draft, and means for determining adjusted values for each of the list of players, based at least in part on base values of the players and the user-defined rules.

In another aspect, a computer-readable medium has instructions encoded thereon which, when executed by a processor, cause an apparatus to perform a method of valuating a player in a fantasy draft comprising storing a list of players, each player associated with a base value, receiving one or more user-defined rules for the draft, and determining adjusted values for each of the list of players, based at least in part, on base values of the players and the user-defined rules.

DETAILED DESCRIPTION

A fantasy sport game, in one embodiment, is a computer-implemented simulation game where users act as managers or owners of simulated sports teams called "fantasy teams," where each team comprises a number of "players." Thus, the term "owner" is used to refer to a participant in the fantasy sport game. An owner can be a natural person or a computer-controlled opponent. Each owner can connect to a fantasy sports gaming system via a network, as described below with respect to FIG. 1. In contrast, the term "player" refers to one of the selectable fantasy characters. In one embodiment, each player corresponds to an athlete in a professional sports league.

One or more owners can form a fantasy sports "league" which consists of several teams which are managed by individual owners. In one scoring scheme, each team is awarded points by the gaming system for accomplishments of the players on the team over a predetermined time period. In one embodiment, the accomplishments correspond to accomplishments of corresponding real-world athletes.

In one embodiment, each team comprises a number of players initially selected from a pool of available players designated by the gaming system. Rules can be in place specifying the number of players on each team, or the number of players having a specific characteristic, such as position, on each team. In one embodiment, each player from the pool can only be selected by one owner and, at any one time, be on one team. Thus, to ensure an even distribution of desirable players amongst owners in a league, owners in the league can participate in a "fantasy draft."

In one embodiment of a fantasy draft, referred to as a "sequential draft," the owners are ordered and each owner, in order, selects a player from the pool of available players.

The selected player is "drafted" onto the owner's team and removed from the pool of available players. Once each owner has drafted a player, referred to a "round," the process repeats and each owner, often, but not necessarily, in order or in reverse order, drafts another player from the pool. This process repeats until each team has the maximum number of allowable players, the pool of available players is exhausted, or there are no players in the pool that simultaneously satisfy all of the league criteria. In one embodiment, a draft may end before the teams have filled their roster when the league rules make this impossible. For example, a 12-team fantasy football league may have three defense slots for each team. In one embodiment, there are only 32 defenses available and, accordingly, at least four teams would not be able to completely fill their roster.

In another embodiment of a fantasy draft, referred to as an "auction draft," each owner is allotted a fixed number of credits. A player is selected from the pool of available players to be put up for auction. Owners bid an increasing number of credits for the auctioned player. The player is "drafted" onto the team of the owner who places the highest bid and is removed from the pool of available players. This process repeats until each team has the maximum number of allowable players, the pool of available players is exhausted, or there are no players in the pool that simultaneously satisfy all of the league criteria. As above, in one embodiment, a draft may end before the teams have filled their roster when the league rules make this impossible.

Figure 1:
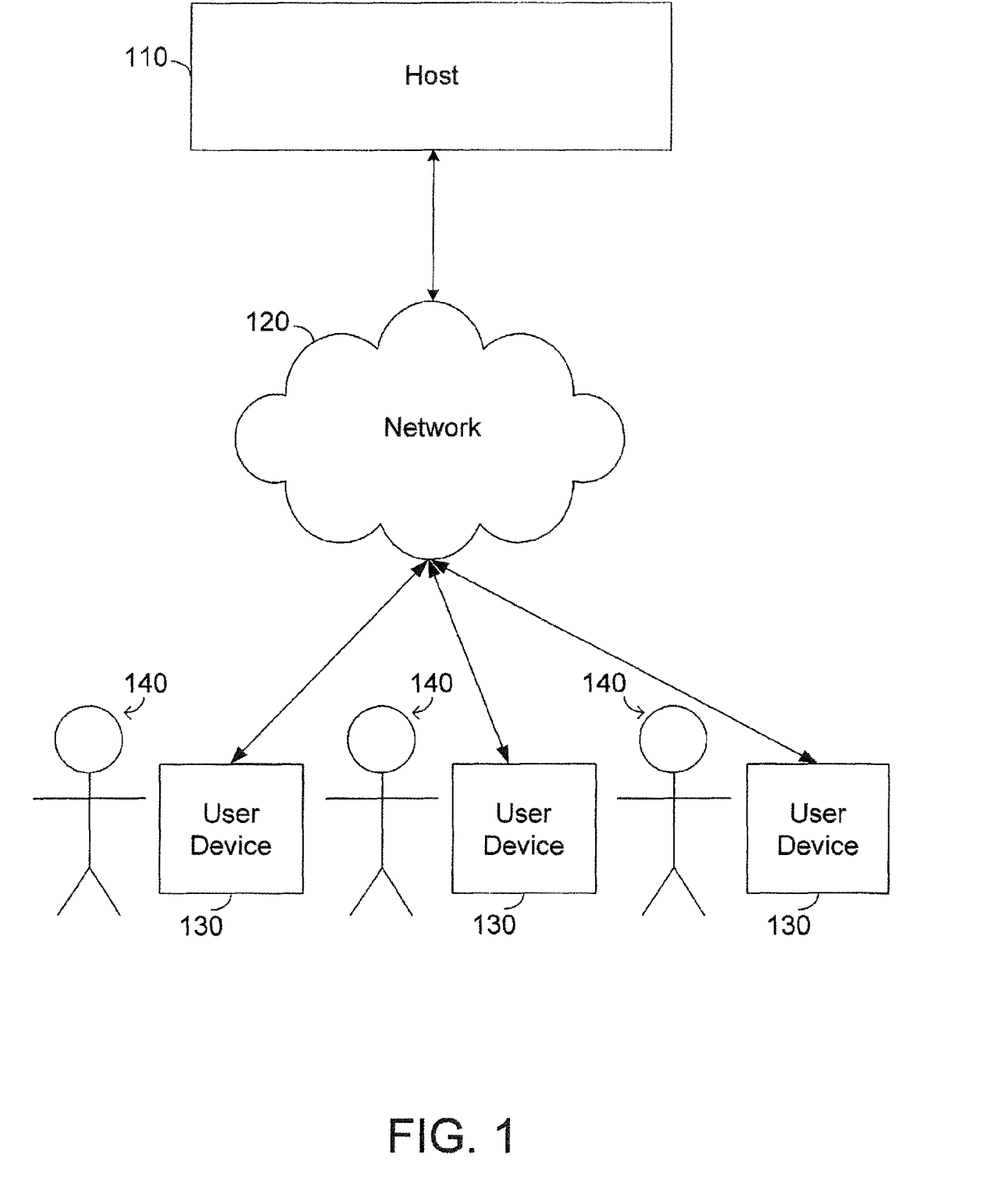
FIG. 1 is a functional block diagram of a system for playing a fantasy sport game.

FIG. 1 is a functional block diagram of a system 100 for playing a fantasy sport game. The system 100 comprises a host 110 connected via a network 120 to a plurality of user devices 130. In one embodiment, the network 120 comprises a public access data network such as the Internet. Each user device 130 is configured to transmit data to and receive data from the host 110 over the network 120 and to receive data from and present data to a user 140.

Figure 2:
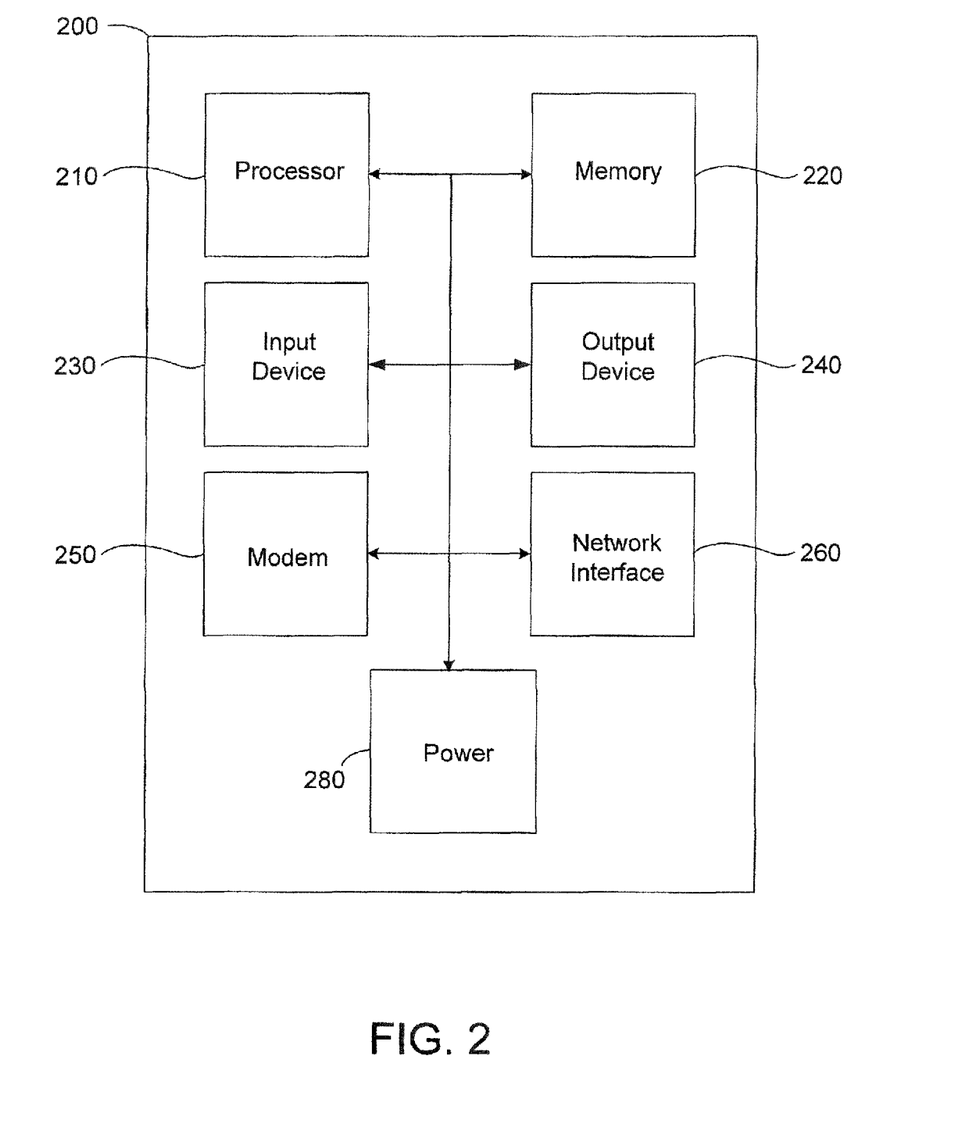
FIG. 2 is a functional block diagram of an embodiment of a user device.

FIG. 2 is a functional block diagram of an embodiment of a user device 200. The user device 200 includes a processor 210 in data communication with a memory 220, an input device 230, and an output device 240. The processor is further in data communication with a modem 250 and a network interface 260. The user equipment 210 and components thereof are powered by a power source 280, such as a battery and/or an interface to an external power source. Although described separately, it is to be appreciated that functional blocks described with respect to the user equipment 200 need not be separate structural elements. For example, the processor 210 and memory 220 can be embodied in a single chip. Similarly, two or more of the processor 210, modem 250, and network interface 260 can be embodied in a single chip or card.

The processor 210 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor can also be implemented as a combination of computing devices, e.g., a combination of a DSP and a microprocessor, a plurality of microprocessors, one or more microprocessors in conjunction with a DSP core, or any other such configuration.

The processor 210 can be coupled, via one or more buses, to read information from or write information to the memory 220. Additionally, the processor can itself contain memory, such as processor registers. The memory 220 can include a processor cache, including a multi-level hierarchical cache in which different levels have different capacities and access speeds. The memory 120 can also include random access memory (RAM), other volatile storage devices, or non-volatile storage devices. The storage can include hard drives, optical discs, such as compact discs (CDs) or digital video discs (DVDs), flash memory, floppy discs, magnetic tape, and Zip drives.

The processor 210 is also coupled to an input device 230 and an output device 240 for, respectively, receiving input from and providing output to, a user of the user equipment 200. Suitable input devices include, but are not limited to, a keyboard, buttons, keys, switches, a pointing device, a mouse, a joystick, a remote control, an infrared detector, a video camera (possibly coupled with video processing software to, e.g., detect hand gestures or facial gestures), a motion detector, or a microphone (possibly coupled to audio processing software to, e.g., detect voice commands). Suitable output devices include, but are not limited to, visual output devices, including displays and printers, audio output devices, including speakers, headphones, earphones, and alarms, and haptic output devices, including force-feedback game controllers and vibrating devices.

The processor 210 is further coupled to a modem 250 and/or a network interface 260. The modem 250 and/or network interface 260 prepare data generated by the processor 210 for transmission over a network according to one or more standards. The modem 250 and network interface 260 can also demodulate data received over the network according to one or more standards. The modem 250 and network interface 260, can be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. In one embodiment, the network interface 260 is coupled to an antenna for wireless communication via the network.

In some embodiments, the user equipment 100 is a personal computer, a laptop computer, a tablet computer, hand-held computer, a mobile telephone, or a smart phone.

Figure 3:
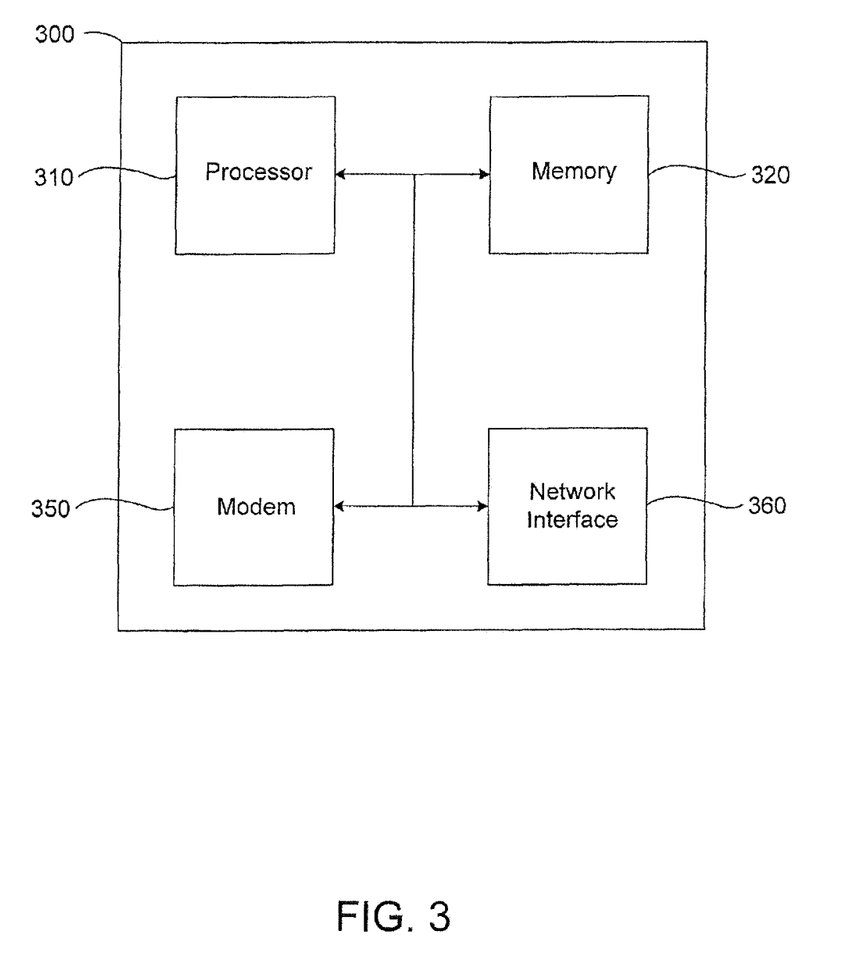
FIG. 3 is a functional block diagram of a host.

FIG. 3 is a functional block diagram of a host 300. The host 300 also includes at least a processor 310 coupled to a memory 320, a modem 350, and a network interface 360. The processor 310, memory 320, modem 350 and network interface 360 can be embodied as described above with respect to the user device 200 of FIG. 2.

Figure 4:
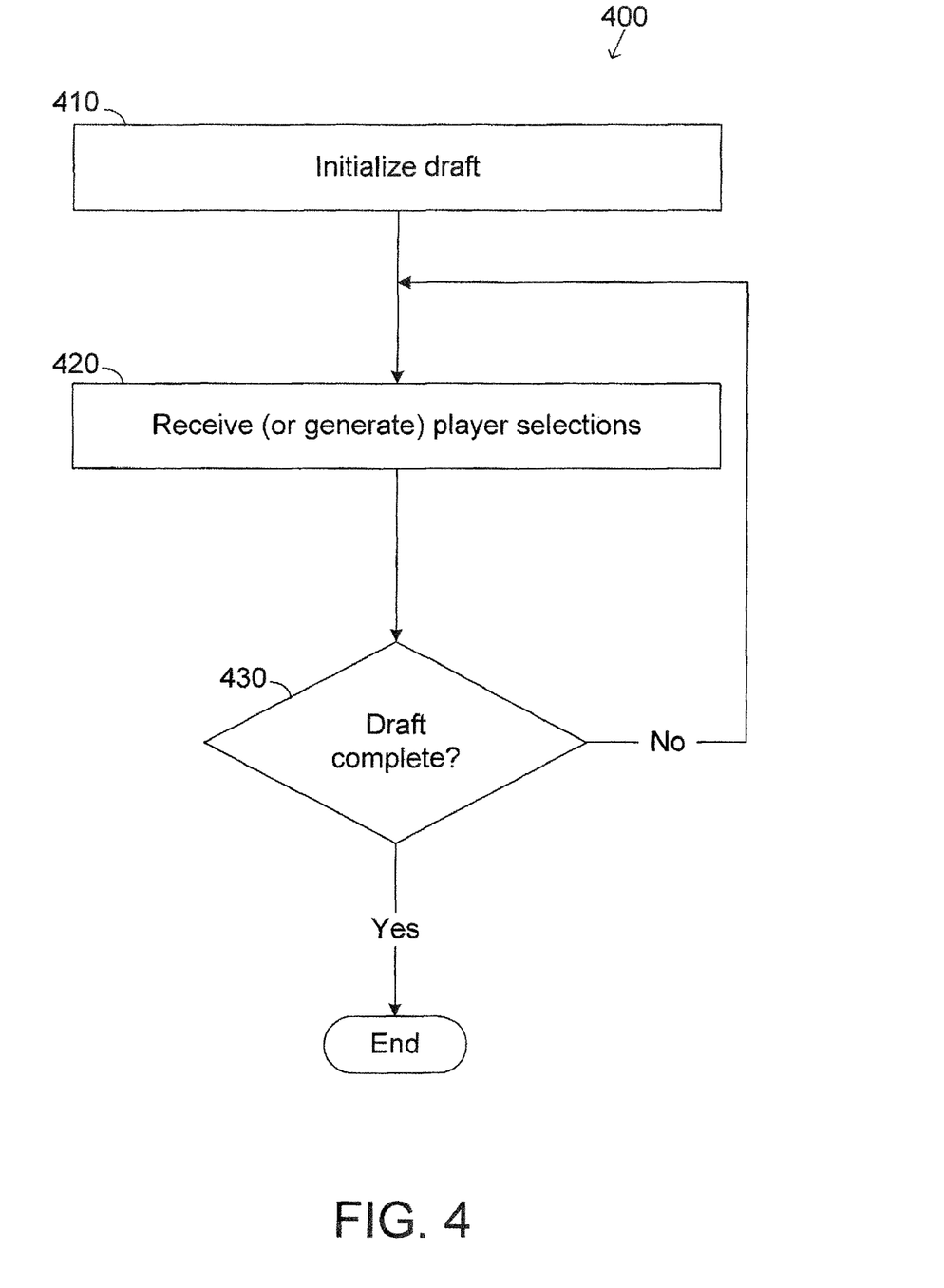
FIG. 4 is a flowchart illustrating a method of a performing a sequential fantasy draft according to one embodiment.

The system 100 of FIG. 1 can be used by a number of owners to play a fantasy sport game. FIG. 4 is a flowchart illustrating a method 400 of a performing a sequential fantasy draft according to one embodiment. FIG. 4 begins in block 410 with the initialization of the draft. The initialization can be performed, for example, by the processor 310 of the host 300 of FIG. 3. In one embodiment, initialization includes storing a pool of players and a team roster for each of a number of owners in the memory 320 of FIG. 3. In one embodiment, initialization includes storing one or more game rules or league-specific game rules in the memory 320 of FIG. 3.

The pool of players, in one embodiment, is stored as an data structure with a plurality of elements, wherein each element corresponds to a different player and stores a plurality of data elements associated with that player, such as a player ID number, the player's name, the player's position, statistics regarding prior performance of the player, a predetermined rank given to the player, a drafted indicator, or a team indicator. The drafted indicator can be a binary value indicating whether or not the player is available to be drafted or has already been drafted by an owner. The team indicator can be a value indicating which team, if any, the player has been drafted to.

The team rosters, in one embodiment, are each stored as a data structure with a plurality of elements, wherein each element corresponds to a roster slot for the team. Each roster slot can store a player ID number, indicating that a player has been drafted for that slot, or a null value indicating that the roster slot is open.

The game rules, which can be league-specific, can indicate the number of teams in the league, a drafting order, a subset of the pool of players which are eligible to be drafted, the maximum number of players allowed on each roster, the maximum number of players of a particular position allowed on each roster, a scoring system, or other gameplay preferences or rules. The game rules can be defined, for example, by a designated owner in the league.

Next, in block 420, selections are received from owners according to a predetermined sequence. In one embodiment, during each round, one selection is received from each owner. In another embodiment, more than one selection is received from an owner during a round. This can occur, for example, if teams have traded their selections (or draft picks). The selection can be determined by the user 140, input into the user device 130, and communicated over the network 120 to the host 110 of FIG. 1. Selection can also be performed automatically by the processor 310 of FIG. 3 for the owner, if the owner is unable to communicate a selection or has instructed the system to make selections on his behalf. The selection can be effectuated, for example, by the processor 310 and memory 320 of FIG. 3 by changing the stored pool of players to indicate that a particular player is no longer available to be drafted and changing the stored team rosters to indicate that the particular player has been drafted to the team of the owner which selected the player, explicitly or automatically.

Continuing to block 430, it is determined whether the draft is complete. The determination can be performed, for example, by the processor 310 of FIG. 3 by analyzing the team rosters stored in the memory 320 and determining whether there are additional empty slots. The determination can be performed, for example, by the processor 310 of FIG. 3 by counting the number of rounds which have occurred. If it is not determined, in block 430, that the draft is complete, the method 400 returns to block 420 for additional selection. Otherwise, the method 400 ends.

Figure 5:
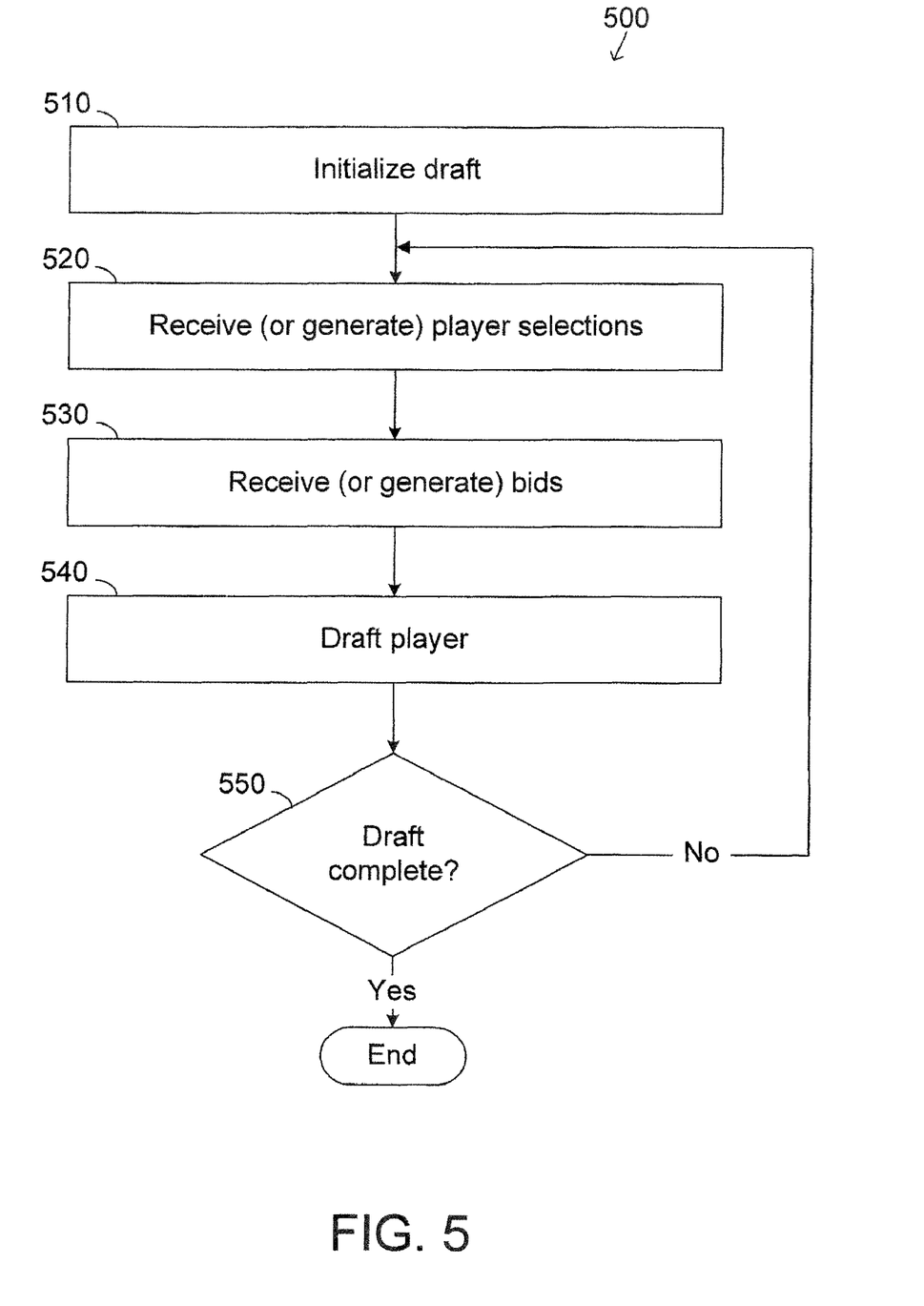
FIG. 5 is a flowchart illustrating a method of performing an auction fantasy draft.

FIG. 5 is a flowchart illustrating a method 500 of performing an auction fantasy draft. The method 500 begins in block 510 with the initialization of the draft. The initialization can be performed, for example, by the processor 310 of the host 300 of FIG. 3. In one embodiment, initialization includes storing a pool of players, a team roster for each of a number of owners, and game rules in the memory 320 of FIG. 3.

The pool of players, in one embodiment, is stored as an data structure with a plurality of elements, wherein each element corresponds to a different player and stores a plurality of data elements associated with that player, such as a player ID number, the player's name, the player's position, statistics regarding prior performance of the player, a predetermined rank given to the player, a drafted indicator, or a team indicator. The drafted indicator can be a binary value indicating whether or not the player is available to be drafted or has already been drafted by an owner. The team indicator can be a value indicating which team, if any, the player has been drafted to.

The team rosters, in one embodiment, are each stored as a data structure with a plurality of elements, wherein each element corresponds to a roster slot for the team. Each roster slot can store a player ID number, indicating that a player has been drafted for that slot, or a null value indicating that the roster slot is open. Each team roster can also store a number of credits remaining for use in the draft.

The game rules, which can be league-specific, can indicate an initial number of credits for each user in the draft, the number of teams in the league, a nominating order, a subset of the pool of players which are eligible to be drafted, the maximum number of players allowed on each roster, the maximum number of players of a particular position allowed on each roster, a scoring system, or other gameplay preferences or rules. The game rules can be defined, for example, by a designated owner in the league.

Next, in block 520, a player is selected for auction. The player selected for auction can be selected based on selections received from owners according to a predetermined sequence. During each round, one selection is received from each owner. In another embodiment, one selection is received from each owner who is eligible to make a selection. The selection can be determined by the user 140, input into the user device 130, and communicated over the network 120 to the host 110 of FIG. 1. Selection can also be performed automatically by the processor 310 of FIG. 3 for the owner, if the owner is unable to communicate a selection or has instructed the system to select on his behalf.

Continuing to block 530, player bids are received. The player bids can be determined by the user 140, input into the user device 130, and communicated over the network 120 to the host 110 of FIG. 1. Bidding can also be performed automatically by the processor 310 of FIG. 3 for the owner, if the owner is unable to communicate a bid or has instructed the system to bid on his behalf.

Next, in block 540, the player is drafted to the team of the owner who placed the highest valid bid, either explicitly or automatically. The drafting can be effectuated, for example, by the processor 310 and memory 320 of FIG. 3 by changing the stored pool of players to indicate that a particular player is no longer available to be drafted, changing the stored team rosters to indicate that the particular player has been drafted to the team of the owner who placed the highest bid, either explicitly or automatically, and changing the team roster of that team to deduct an amount of credits equal to the highest bid.

Continuing to block 550, it is determined whether the draft is complete. The determination can be performed, for example, by the processor 310 of FIG. 3 by analyzing the team rosters stored in the memory 320 and determining whether there are additional empty slots. The determination can be performed, for example, by the processor 310 of FIG. 3 by counting the number of player auctions which have occurred. If it is not determined, in block 550, that the draft is complete, the method 500 returns to block 520 for additional selection. Otherwise, the method 500 ends.

In one embodiment, a fantasy draft is held at a scheduled time and each owner has a predetermined limited amount of time to select a player or place bids on a player. In some circumstances, an owner is unable to participate in a fantasy draft at the scheduled time or otherwise communicate selections or bids at the scheduled time, perhaps due to a scheduling conflict, illness, or technical difficulties in connecting to the host. As mentioned above with respect to block 420 of FIG. 4, in one embodiment, selection or bidding can be performed automatically by the processor 310 of FIG. 3 for the owner if the owner is unable to communicate a selection or a bid during the scheduled time.

In one embodiment, each of the players in the pool of players is assigned a rank or bidding value prior to the draft. The initial rank or bidding value can be assigned by an expert or by a computer based on past or expected performance of the player. In one embodiment, when a user is unable to communicate a selection, the system automatically selects the non-drafted player with the highest initial rank. In one embodiment, when a user is unable to communicate a bid, the system automatically bids on a player up to the bidding value.

In one embodiment, a user can, in advance of the draft, communicate a user-ranked list of players to the host. If the user is unable to communicate a selection, the system automatically selects the non-drafted player with the highest rank as communicated by the user. In one embodiment, a user can, in advance of the draft, communicate user-defined bidding values. If the user is unable to communicate a bid, the system automatically bids on a player up to the user-defined bidding values.

In one embodiment of a fantasy sport game, each team is allowed a maximum number of players. Further, each team has an active roster and an inactive roster. In one embodiment, each team roster stored in the memory 320 of FIG. 3 stores an active indictor for each player indicating whether the player is on the active roster. Only players designated as part of the active roster contribute to the team's performance, e.g., only players on the active roster contribute points to a team's score. In one embodiment, a maximum number of players are allowed on the active roster.

As mentioned above, each player can be associated with one or more positions. For example, a player can be associated with a quarterback position or a wide receiver position. As another example, a player can be associated with a first base position or a pitcher position. A player can be associated with more than one position. For example, a player can be associated with a second base and a shortstop position. As another example, a player can be associated with a center position or a power forward position. A player can be associated with a position indicative of multiple positions. For example, a player can be associated with an outfielder position indicative of a left fielder position, a center fielder position, and a right fielder position. As another example, a player can be associated with a guard position indicative of a shooting guard position and a point guard position.

In one embodiment, a maximum number of players associated with each of a number of positions are allowed on the active roster. For example, a fantasy football team can be allowed to have 16 players, but the team can only be allowed to have one quarterback, two running backs, two wide receivers, one tight end, and one kicker on the active roster. As another example, a fantasy baseball team can be allowed to have 20 players, but the team can only be allowed to have one pitcher, one catcher, four infielders, and three outfielders on the active roster. As another example, a fantasy basketball team can be allowed to have 10 players, but the team can only be allowed to have one center, one power forward, one small forward, one shooting guard, and one point guard on the active roster.

The performance of a fantasy sport team can be improved by having a balanced roster, e.g. a number of players associated with each position. In one embodiment, described above, when a user is unable to communicate a selection, the system automatically selects the non-drafted player with the highest initial rank or highest user-defined rank. In some drafts, this can result in an unbalanced team in which multiple players of a first position are selected to the exclusion of players of a second position because, for each selection, a player of the first position was ranked higher than players of the second position.

In one embodiment, a user can, in advance of the draft, communicate one or more user-defined rules to the host. If the user is unable to communicate a selection during the scheduled time, selection will be performed automatically based on the user-defined rules. For example, the user can communicate a user-defined rule indicating that, in a particular round, a player of a particular position should be selected. As another example, the user can communicate a user-defined rule indicating that, in any round, a player of a particular position should not be selected if a particular number of players of that position have already been selected to the team roster.

Figure 6:
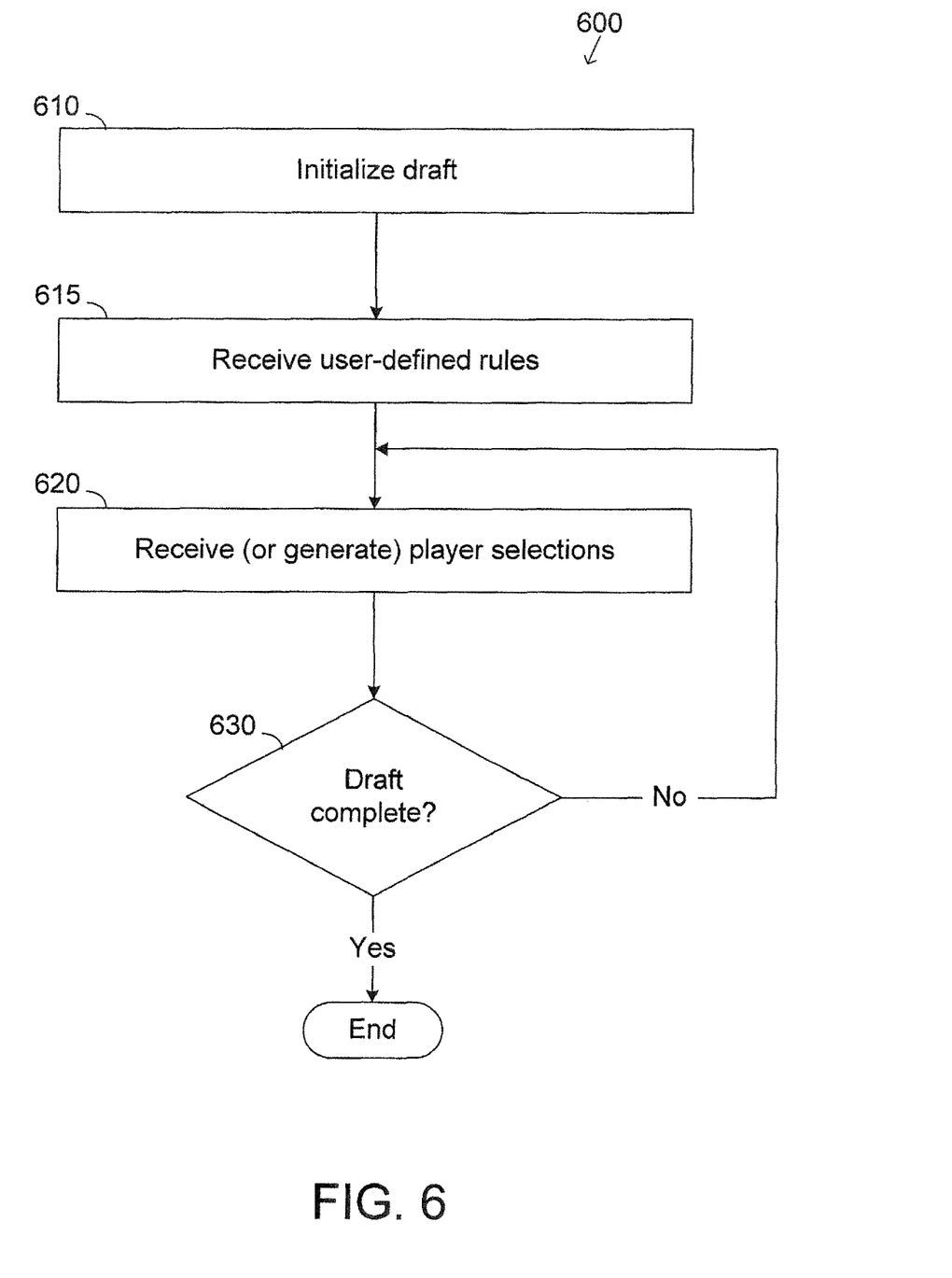
FIG. 6 is a flowchart of a method of performing a sequential fantasy draft utilizing user-defined rules.

FIG. 6 is a flowchart of a method 600 of performing a sequential fantasy draft utilizing user-defined rules. The method 600 begins in block 610 with the initialization of the draft. The initialization can be performed, for example, as described above with respect to FIG. 410 of FIG. 4. In particular, a pool of players is stored, wherein each player is associated with various data elements such as, but not limited to, player ID number, the player's name, the player's position, statistics regarding prior performance of the player, a predetermined rank given to the player, a drafted indicator, or a team indicator. Further, team rosters are stored for each of a plurality of owners.

In block 615, one or more user-defined rules are received. The user-defined rules can be determined by the user 140, input into the user device 130, and communicated over the network 120 to the host 110 of FIG. 1.

In one embodiment, the user-defined rule indicates that, in a particular round, a player of a particular position should be selected for a particular owner. Multiple such user-defined rules can be received, indicating different positions for different rounds. For example, an owner can communicate user-defined rules indicating that, in the first round, a running back (e.g., a player associated with the running back position) should be selected, in the second round, a quarterback should be selected, and in the third round, a wide receiver should be selected. In one embodiment, the user-defined rule indicates that, in a particular round, a player of one or more particular positions should be selected for a particular owner. For example, an owner can communicate a user-defined rule indicating that, in the first round, a shooting guard or small forward should be selected.

In one embodiment, the user-defined rule indicates that, in any round, a player of a particular position should only be selected if less than particular number of players of that position have already been selected to the team roster of the owner. For example, a user-defined rule can indicate that a kicker should not be selected if two kickers have already been selected to the team roster. In another embodiment, the user-defined rule indicates that, in any round, a player of a particular position should only be selected if a particular number of players of a different position have already been selected to the team roster of the owner. For example, a user-defined rule can indicate that a wide receiver should be selected only if two running backs have already been selected to the team roster.

Although, in one embodiment, the user-defined rule is defined with respect to player position, any player characteristic can be the subject of a user-defined rule. For example, a user-defined rule can indicate that a player associated with an age less than a particular value should be selected in a particular round. As another example, a user-defined rule can indicate that a player associated with a specific professional sports team (e.g., Los Angeles Lakers, Seattle Mariners, New England Patriots, etc.) should be selected in a particular round. As another example, a user-defined rule can indicate that a player having a name beginning with a particular letter be should be selected in a particular round.

In one embodiment, the user-defined rule indicates that, in a particular round, a player associated with the greatest (or least) number of particular statistic should be selected. For example, a user-defined rule can indicate that, in the fourth round, the player associated with the greatest number of home runs in the previous season should be selected. As another example, a user-defined rule can indicate that, in the seventh round, the player associated with the greatest number of lifetime steals should be selected. As another example, a user-defined rule can indicate that, in the first round, the player associated with the least number of interceptions should be selected. As another example, a user-defined rule can indicate that, in the fifteenth round, the player projected to have the most runs scored in the upcoming season should be selected.

It is to be appreciated that multiple user-defined rules can be in effect during any particular selection. Thus, a user-defined rule can indicate that in the first round, a quarterback should be selected and another user-defined rule can indicate that in the first round, a player with the greater number of touchdowns should be selected. These rules indicate that, in the first round, the quarterback with the greatest number of touchdowns should be selected.

It is to be appreciated that user-defined rules can be simple or complex. For example, a user-defined rule can indicate that, in the second round, a running back with more than fifteen touchdowns should be selected, but if one is not available, a quarterback with a quarterback rating of over a hundred should be selected, but if one is not available, the highest ranked running back should be selected. As another example, a user-defined rule can indicate that, in the fifth round, if one is available and three outfielders have not already been selected to team, an outfielder with more than 20 home-runs should be selected, where if one is not available and three outfielders have not already been selected to the team, the available outfielder with the highest on-base percentage (OBP) should be selected, where if three outfielders have already been selected to the team, the pitcher with the lowest earned run average (ERA) should be selected.

Although, in one embodiment, the user-defined rule is defined with respect to the owner's roster, the team rosters of owners can be the subject of a user-defined rule. For example, a user-defined rule can indicate that a kicker should only be selected if two other owners have selected kickers. A particular player can also be the subject of a user-defined rule or a portion thereof. For example, a user-defined rule can indicate that a tight end should only be selected if three other owners have selected a tight end, unless that tight end is "Antonio Gates."

It is to be appreciated that the above examples are in no way limiting, and other user-defined rules can be defined and communicated by the user to the host.

Continuing, in block 620, selections are received from owners according to a predetermined sequence. During each round, one selection is received from each owner. The selection can be determined by the user 140, input into the user device 130, and communicated over the network 120 to the host 110 of FIG. 1. In one embodiment, the host 110 prompts the user with a selection based on the user-defined rules. If the owner is unable to communicate a selection or instructs that a selection be made automatically on his behalf, selection can also be performed automatically, by the processor 310 of FIG. 3, for the owner based on the user-defined rules. If the user-defined rules exclude all players remaining to be drafted, a default selection may performed. For example, the highest ranked player may be selected. The selection can be effectuated, for example, by the processor 310 and memory 320 of FIG. 3 by changing the stored pool of players to indicate that a particular player is no longer available to be drafted and changing the stored team rosters to indicate that the particular player has been drafted to the team of the owner which selected the player, explicitly or automatically.

Next, in block 630, it is determined whether the draft is complete. The determined can be performed as described above with respect to block 430 of FIG. 4. If it is not determined, in block 630, that the draft is complete, the method 600 returns to block 620 for additional selection. Otherwise, the method 600 ends.

Figure 7:
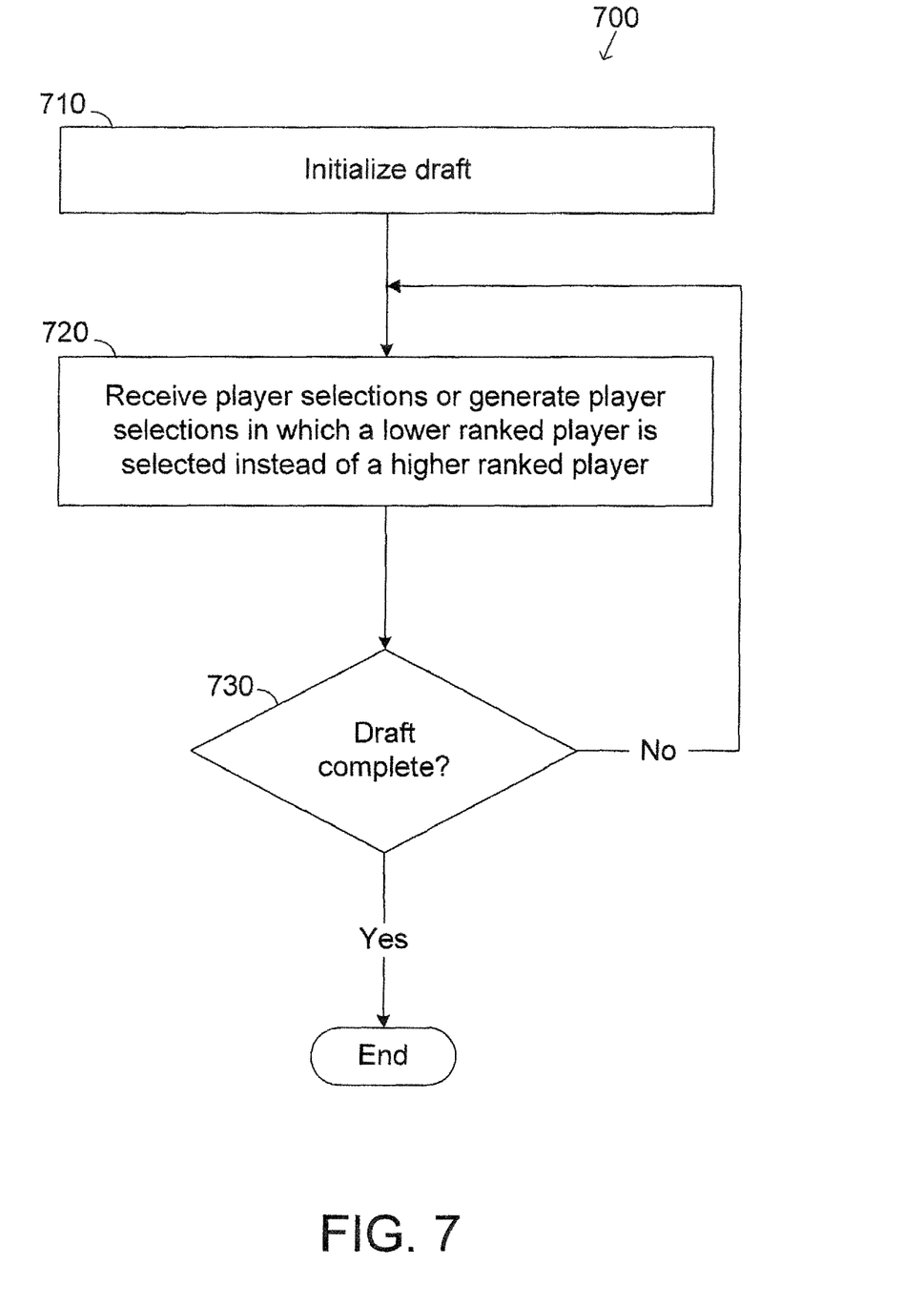
FIG. 7 is a flowchart illustrating a method of performing a sequential fantasy draft utilizing non-sequential automatic selection.

FIG. 7 is a flowchart illustrating a method 700 of performing a sequential fantasy draft utilizing non-sequential automatic selection. FIG. 7 begins in block 710 with the initialization of the draft. The initialization can be performed, for example, as described above with respect to FIG. 410 of FIG. 4. In particular, a pool of players is stored, wherein each player is associated with various data elements including a predetermined rank for each player. Further, team rosters are stored for each of a plurality of owners.

As mentioned above, in one embodiment of a fantasy sport game, each team is allowed a maximum number of players. Further, each team has an active roster and an inactive roster and a maximum number of players associated with each of a number of positions are allowed on the active roster. The maximum number of players allowed and the maximum number of players associated with each of a number of positions allowed on the active roster can be stored, for example, in the memory 320 of FIG. 3.

Next, in block 720, selections are received from owners according to a predetermined sequence. During each round, one selection is received from each owner. The selection can be determined by the user 140, input into the user device 130, and communicated over the network 120 to the host 110 of FIG. 1. Selection can also be performed automatically by the processor 310 of FIG. 3 for the owner, if the owner is unable to communicate a selection.

In one embodiment, the highest ranked non-drafted player is automatically selected for the owner. In another embodiment, the team roster is taken into account in making the automatic selection. In particular, in one embodiment, the available active slots for particular positions are used in making the automatic selection. An owner has an available active slot for a particular position if the roster has less than the maximum number of players allowed on the active roster associated with the position.

In one embodiment, the N highest ranked non-drafted players are analyzed and the highest ranked non-drafted player for which the owner has an available active slot for the position of the player is selected. If the owner does not have an active slot for the position of any of the N players, the highest ranked non-drafted player is selected regardless of the roster. In one embodiment, N is predetermined by the owner in advance of the draft. In another embodiment, N is determined by the host as approximately 1.5 times the number of teams in the league. In another embodiment, N is determined by the host as an approximation of the likelihood of being able to draft the highest ranked non-drafted player in a later round.

For example, if the owner has an active slot for a quarterback and the highest ranked non-drafted player is a quarterback, that player is selected. As another example, if the owner does not have an active slot for a quarterback, but has an active slot for a running back, and the highest ranked non-drafted player is a quarterback and the second highest ranked non-drafted player is a running back, the running back is selected. Thus, in one embodiment, a player with a lower rank is selected rather than a player with a higher rank. As another example, if the owner does not have an active slot for a quarterback, but has an active slot for a kicker, and the highest ranked non-drafted player is a quarterback and the next N highest ranked non-drafted players are not a kicker, the quarterback is selected.

The selection can be effectuated, for example, by the processor 310 and memory 320 of FIG. 3 by changing the stored pool of players to indicate that a particular player is no longer available to be drafted and changing the stored team rosters to indicate that the particular player has been drafted to the team of the owner which selected the player, explicitly or automatically.

Continuing to block 730, it is determined whether the draft is complete. The determined can be performed as described above with respect to block 430 of FIG. 4. If it is not determined, in block 730, that the draft is complete, the method 700 returns to block 720 for additional selection. Otherwise, the method 700 ends.

As mentioned above, in one embodiment, each of the players in the pool of players is assigned an initial bidding value prior to the draft. The initial bidding value can be assigned by an expert or by a computer based on past or expected performance of the player. In one embodiment, when a user is unable to communicate a bid or requests that the system bid on his behalf, the system automatically bids on a player up to the bidding value. However, conditions and the actual value of players change during the course of a draft and bidding decisions based on the initial bidding values can be suboptimal.

Figure 8:
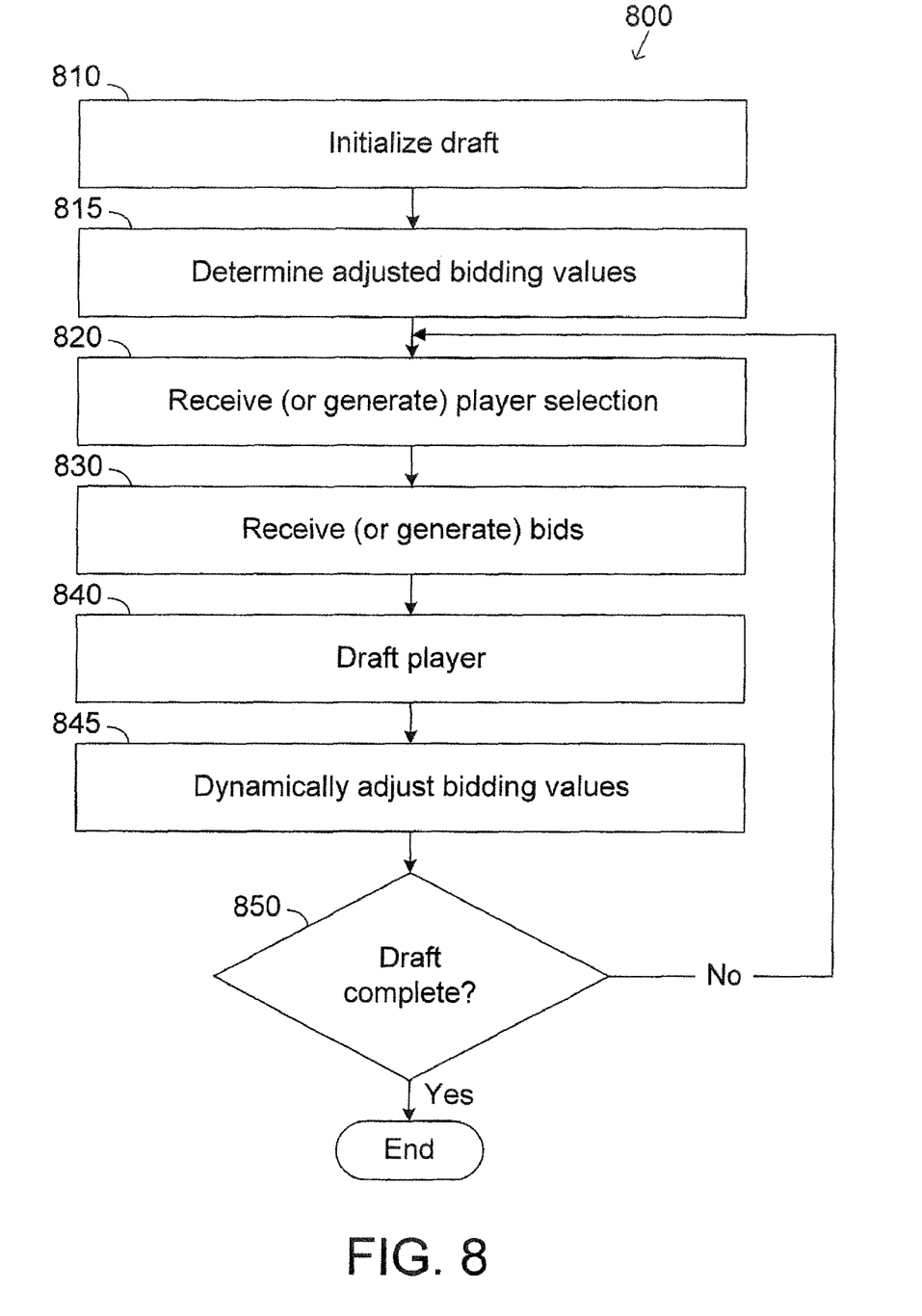
FIG. 8 is a flowchart illustrating a method of performing an auction fantasy draft with dynamic bidding values.

FIG. 8 is a flowchart illustrating a method 800 of performing an auction fantasy draft with dynamic bidding values. FIG. 8 begins in block 810 with the initialization of the draft. The initialization can be performed, for example, by the processor 310 of the host 300 of FIG. 3. In one embodiment, initialization includes storing a pool of players and a team roster for each of a number of owners in the memory 320 of FIG. 3. The initialization can be performed as described above with respect to block 510 of FIG. 5. In particular, a pool of players is stored, wherein each player is associated with various data elements including an initial bidding value, or base value, for each player. Further, team rosters are stored for each of a plurality of owners and game rules are stored.

Continuing to block 815, adjusted bidding values are determined for each player based on the base value of each player and the stored game rules.

In one embodiment, the adjusted bidding values are determined based on the league size, e.g., the number of teams in the league. In one embodiment, the initial bidding values are determined for a league with a particular number of teams and the adjusted bidding values are increased in leagues with an actual number of teams in the league greater than the particular number of teams. In one embodiment, the adjusted bidding values are determined as the ratio of the actual number of teams in the league and the particular number of teams. Thus, in one embodiment, if initial bidding values are determined for a league with ten teams, the adjusted bidding values will be 1.5 times the initial bidding values for a league with fifteen teams. In another embodiment, the adjusted bidding values are determined based on a non-linear function of the initial bidding values. For example, in one embodiment a player with a base value of 50 would have an adjusted value of 100, whereas a player with a base value of 25 would have an adjusted value of 40.

In one embodiment, the adjusted bidding values are determined based on the team budget, e.g., the initial number of credits for each owner in the draft. In one embodiment, each owner is provided with a different budget and the adjusted bidding values are determined for each owner. This allows for less-experienced owners to be given a handicap and thereby provide a competitive experience with more-experienced owners. In one embodiment, the initial bidding values are determined for a particular budget and the adjusted bidding values are increased for teams having an actual budget greater than the particular budget. In one embodiment, the adjusted bidding values are determined as the ratio of the actual budget and the particular budget. Thus, in one embodiment, if initial bidding values are determined for a budget of 260, the adjusted bidding values will be 1.5 times the initial bidding values for a team with a budget of 390. In another embodiment, the adjusted bidding values are determined based on a non-linear function of the initial bidding values. For example, in one embodiment a player with a base value of 50 would have an adjusted value of 100, whereas a player with a base value of 25 would have an adjusted value of 40.

In one embodiment, the adjusted bidding values are determined based on the active roster composition, e.g., the maximum number of players of each position allowed on the active team roster. In one embodiment, the initial bidding values are determined for a default active roster composition and the adjusted bidding values for particular players are increased or decreased based on the actual active roster composition. In one embodiment, if a roster composition has a greater number of active roster slots for a particular position than the default roster composition, players with that position can have adjusted bidding values which are less than the initial bidding values. For example, if a particular league only allows one active running back, a running back with good expected performance is less valuable in that league than in a league that allows six running backs.

In one embodiment, the adjusted bidding values are determined based on the bench roster composition, e.g. the maximum number of players allowed on the team roster which are not part of the active team roster. For example, if the bench roster is small (as compared to a default size on which the initial bidding values are determined), players can be less valuable and the adjusted bidding values can be smaller than the base values.

In one embodiment, the adjusted bidding values are determined based on a player universe, e.g. a subset of the pool of players that are eligible to be drafted. For example, in one embodiment, a fantasy baseball league may only allow drafting of National League player or only allow drafting of American League players. Thus, the adjusted bidding values are increased or decreased based on the limited pool of talented players.

In one embodiment, the adjusted bidding values are determined based on a scoring system, e.g., the translation of a player's statistics into points for the owners. For example, a first scoring system provides six points for a touchdown and one point for every twenty yards and a second scoring system provides zero points for a touchdown, but one point for every ten yards. A first player (or rather, their real-world counterpart) is used in goal line situations and scores many touchdowns but does not run for many yards, whereas a second player (or rather, their real-world counterpart) is used more generally and scores less touchdowns, but runs for more yards than the first player. The first player would be more valuable than the second player in the first scoring system, but the second player would be more valuable than the first player in the second scoring system. Accordingly, the past statistics or expected statistics of a player may be used, as weighed by the scoring system, to determine an adjusted base value for the player.

Next, in block 820, a player is selected for auction. The player selected for auction can be selected based on selections received from owners according to a predetermined sequence. During each round, one selection is received from each owner. The selection can be determined by the user 140, input into the user device 130, and communicated over the network 120 to the host 110 of FIG. 1. Selection can also be performed automatically by the processor 310 of FIG. 3 for the owner, if the owner is unable to communicate a selection.

Progressing to block 825, the adjusted bidding value (or dynamically adjusted bidding value as described below with respect to block 845) of the selected player is sent to the owner to assist in determining an amount to bid for the selected player. The sending can be performed, for example, by the network interface 360 of FIG. 3. The adjusted bidding value can be displayed to the user, for example, by the output device 240 of FIG. 2.

Continuing to block 830, player bids are received. The player bids can be determined by the user 140, input into the user device 130, and communicated over the network 120 to the host 110 of FIG. 1. Bidding can also be performed automatically by the processor 310 of FIG. 3 for the owner, if the owner is unable to communicate a bid or instructs the system to bid on his behalf. In one embodiment, when a user is unable to communicate a bid, the system automatically bids on a player up to the adjusted bidding value (or up to the dynamically adjusted bidding value as described below with respect to block 845).

Next, in block 840, the player is drafted to the team of the owner who placed the highest bid, either explicitly or automatically. The drafting can be effectuated, for example, by the processor 310 and memory 320 of FIG. 3 by changing the stored pool of players to indicate that a particular player is no longer available to be drafted, changing the stored team rosters to indicate that the particular player has been drafted to the team of the owner who placed the highest bid, either explicitly or automatically, and changing the team roster of that team to deduct an amount of credits equal to the highest bid.

Progressing to block 845, the adjusted bidding values are dynamically adjusted based on the results of the bidding.

In one embodiment, bidding values are dynamically adjusted upward when a player is drafted with a winning bid which is less than the expected winning bid for the player. The expected winning bid can be, for example, the initial bidding value, the adjusted bidding value, or the dynamically adjusted bidding value. Similarly, bidding values are dynamically adjusted downward when a player is drafted with a winning bid which is greater than the expected winning bid for the player. For example, if a player with an expected winning bid of 50 is drafted with a winning bid of 100, this indicates that (on average) the owners have a smaller remaining budget than they were expected to have when the bidding values were last determined. In an extreme example, if a player with an expected winning bid of 50 is drafted with a winning bid of 150 (the entire remaining budget of a particular owner), this indicates that there will be less competition for later-drafted players as that particular owner will not be submitting bids.

In one embodiment, bidding values are dynamically adjusted based on the players already drafted on the owner's team. For example, if an owner no longer has an active slot for a particular position, players with that particular position are less valuable and their bidding values can be adjusted downwards. In one embodiment, bidding values are dynamically adjusted based on the players already drafted by all owners in the league. For example, if each owner, except one, has filled their active slots for a particular position, the remaining owner would expect little competition in filling his or her active slot for that position. Thus, the bidding values can be dynamically adjusted downward for players associated with that position.

Continuing to block 850, it is determined whether the draft is complete. The determination can be performed, for example, by the processor 310 of FIG. 3 by analyzing the team rosters stored in the memory 320 and determining whether there are additional empty slots. The determination can be performed, for example, by the processor 310 of FIG. 3 by counting the number of player auctions which have occurred. If it is not determined, in block 850, that the draft is complete, the method 800 returns to block 820 for additional selection. Otherwise, the method 800 ends.

It is also to be recognized that, depending on the embodiment, the acts or events of any methods described herein can be performed in other sequences, may be added, merged, or left out altogether (e.g., not all acts or events are necessary for the practice of the methods), unless the text specifically and clearly states otherwise.

While the above description points out certain novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A method of valuating a player in a fantasy draft, the method comprising:
   hosting a fantasy draft for a plurality of user devices, wherein a server hosts the fantasy draft and connects with the plurality of user devices via a communication network;
   generating a list of players, each player associated with a value and currently available to be selected during the fantasy draft;
   receiving a selection of a first player from a first user device of the plurality of user devices, wherein the first player is removed from the list of players and is associated with the first user device based on the selection;
   determining adjusted values for the list of players in the fantasy draft, the adjusted values based on the base values associated with each player and an aspect of a predetermined rule set associated with the fantasy draft; and providing one or more suggested players to a second user device of the plurality of the plurality of user devices prior to the second user device making a selection during the fantasy draft.

2. The method of claim 1, further comprising:
receiving a selection of a second player from the second user device of the plurality of user devices, wherein the second player is removed from the list of players and is associated with the second user device based on the selection.

3. The method of claim 1, wherein the fantasy draft is a sequential draft type.

4. The method of claim 1, wherein the fantasy draft is an auction draft type and the value is an initial bidding value.

5. The method of claim 1, wherein the fantasy draft is for a fantasy league and wherein the adjusted value is based on a scoring system for the fantasy league.

6. The method of claim 1, wherein each player is associated with one or more characteristics from a predefined set of characteristics and wherein the adjusted values are based on the characteristics.

7. The method of claim 6, wherein the predefined set of characteristics include a position.

8. The method of claim 1, wherein the adjusted value is based on a number of players associated with the second user device.

9. The method of claim 1, wherein the adjusted value is based on a number of fantasy sport teams in a fantasy sport league corresponding to the fantasy draft.

10. The method of claim 1, wherein the adjusted value is based on a budget associated with the second user device.

11. A device for valuating a player in a fantasy draft, the device comprising:
a network interface configured to communicate with a plurality of user devices via a network connection; and
a processor configured to perform operations, the operations comprising:
hosting a fantasy draft for a plurality of user devices, wherein a server hosts the fantasy draft and connects with the plurality of user devices via a communication network;
generating a list of players, each player associated with a value and currently available to be selected during the fantasy draft;
receiving a selection of a first player from a first user device of the plurality of user devices, wherein the first player is removed from the list of players and is associated with the first user device based on the selection;
determining adjusted values for the list of players in the fantasy draft, the adjusted values based on the base values associated with each player and an aspect of a predetermined rule set associated with the fantasy draft; and
providing one or more suggested players to a second user device of the plurality of the plurality of user devices prior to the second user device making a selection during the fantasy draft.

12. The method of claim 11, wherein the fantasy draft is a sequential draft type.

13. The method of claim 11, wherein the fantasy draft is an auction draft type and the value is a bidding value.

14. The method of claim 11, wherein the fantasy draft is for a fantasy league and wherein the adjusted value is based on a scoring system for the fantasy league.

15. The method of claim 11, wherein each player is associated with one or more characteristics from a predefined set of characteristics and wherein the adjusted values are based on the characteristics.

16. The method of claim 11, wherein the adjusted value is based on a bench roster composition associated with the second user device.

17. The method of claim 11, wherein the adjusted value is based on a number of fantasy sport teams in a fantasy sport league corresponding to the fantasy draft.

18. The method of claim 11, wherein the adjusted value is based on a budget associated with the second user device.

19. The method of claim 11, wherein the adjusted value is based on a user-defined rule set associated with the second user device.

20. A non-transitory computer-readable storage medium having instructions encoded thereon which, when executed by a processor, cause the processor to perform operations, the operations comprising:
hosting a fantasy draft for a plurality of user devices, wherein a server hosts the fantasy draft and connects with the plurality of user devices via a communication network;
generating a list of players, each player associated with a value and currently available to be selected during the fantasy draft;
receiving a selection of a first player from a first user device of the plurality of user devices, wherein the first player is removed from the list of players and is associated with the first user device based on the selection;
determining adjusted values for the list of players in the fantasy draft, the adjusted values based on the base values associated with each player and an aspect of a predetermined rule set associated with the fantasy draft; and
providing one or more suggested players to a second user device of the plurality of the plurality of user devices prior to the second user device making a selection during the fantasy draft.

* * * * *